United States Patent
Millet et al.

(10) Patent No.: US 12,409,582 B2
(45) Date of Patent: Sep. 9, 2025

(54) TOOL FOR LAYING A SEALING STRIP AROUND A PROTRUDING PART OF A CONNECTING ELEMENT, METHOD FOR LAYING A SEALING STRIP USING SAID TOOL, AND AIRCRAFT COMPRISING AT LEAST ONE SEALING STRIP OBTAINED USING SAID LAYING METHOD

(71) Applicant: Airbus Operations (S.A.S.), Toulouse (FR)

(72) Inventors: Gérard Millet, Toulouse (FR); Vincent Delpy, Toulouse (FR); Simon Foucart-Gaudy, Toulouse (FR)

(73) Assignee: Airbus Operations (S.A.S.), Toulouse (FR)

( * ) Notice: Subject to any disclaimer, the term of this patent is extended or adjusted under 35 U.S.C. 154(b) by 93 days.

(21) Appl. No.: 18/309,374

(22) Filed: Apr. 28, 2023

(65) Prior Publication Data
US 2023/0373134 A1    Nov. 23, 2023

(30) Foreign Application Priority Data
May 17, 2022    (FR) ...................................... 2204679

(51) Int. Cl.
| | |
|---|---|
| *B29C 39/10* | (2006.01) |
| *B05C 5/02* | (2006.01) |
| B29L 31/30 | (2006.01) |
| B64D 37/00 | (2006.01) |

(52) U.S. Cl.
CPC ............... *B29C 39/10* (2013.01); *B05C 5/02* (2013.01); *B29L 2031/3076* (2013.01); *B64D 37/005* (2013.01)

(58) Field of Classification Search
USPC .................................. 118/313–315, 504, 505
See application file for complete search history.

(56) References Cited

FOREIGN PATENT DOCUMENTS

| DE | 3642537 A1 | 6/1988 | |
|---|---|---|---|
| EP | 3020528 A1 | 5/2016 | |
| EP | 3546375 A1 | 10/2019 | |
| FR | 531776 A | 1/1922 | |
| GB | 2514171 A * | 11/2014 | ............. B64D 45/02 |

OTHER PUBLICATIONS

French Search Report for Application No. 2204679 dated Dec. 23, 2022.

* cited by examiner

*Primary Examiner* — Yewebdar T Tadesse
(74) *Attorney, Agent, or Firm* — KDW Firm PLLC

(57) ABSTRACT

A tool for laying a sealing strip around a protruding part of a connecting element protruding from a bearing surface, the laying tool including an annular duct having an outer surface configured to delimit, with the bearing surface and the protruding part, a cavity when the annular duct is positioned around the protruding part and in contact with the bearing surface, the annular duct including at least one orifice for supplying pasty composition and outlet orifices for injecting the pasty composition into the cavity to form the sealing strip. A method for laying a sealing strip using the tool is disclosed and an aircraft with at least one sealing strip obtained using the method.

17 Claims, 10 Drawing Sheets

TOOL FOR LAYING A SEALING STRIP AROUND A PROTRUDING PART OF A CONNECTING ELEMENT, METHOD FOR LAYING A SEALING STRIP USING SAID TOOL, AND AIRCRAFT COMPRISING AT LEAST ONE SEALING STRIP OBTAINED USING SAID LAYING METHOD

TECHNICAL FIELD

The disclosure herein relates to a tool for laying a sealing strip around a protruding part of a connecting element, to a method for laying a sealing strip using the tool, and to an aircraft comprising at least one sealing strip obtained using the laying method.

BACKGROUND

According to one embodiment, an aircraft comprises a central fuel tank, positioned in the region where the fuselage and the wings meet, delimited by walls through certain regions of which numerous connecting elements, such as bolts for example, pass.

As illustrated in FIGS. 1 and 2, the tank comprises a wall 10 having a bearing surface F10 oriented towards the interior of the tank and an orifice 10.1 passing through the wall. The wall 10 also comprises a connecting element 12, such as a bolt for example, having a shank 12.1 passing through the orifice 10.1 and a head 12.2 protruding from the bearing surface F10. To obtain a seal, the head 12.2 of the connecting element 12 is embedded in a mass 14 of sealant mastic. This mass 14 covers the region of the surface F10 surrounding the head 12.2 and also the latter.

This mass 14 of sealant mastic is deposited by an operator using a mastic gun. According to one mode of operation, the operator positions the nozzle of the mastic gun above the head 12.2 and presses the trigger of the gun until a mass covering the entire head 12.2 and the peripheral region thereof is formed.

Given this mode of operation and the large number of connecting parts, a significant volume of sealant mastic is necessary to obtain a seal at all of the connecting elements. This volume necessarily has an impact on the mass of the aircraft.

According to this mode of operation, the quality of the seal depends essentially on the dexterity of the operator, who has to repeat this operation on all of the connecting elements.

Lastly, once in place, the mass 14 of sealant mastic entirely covers the head 12.2, and so it conceals any marking applied to the head 12.2 of the connecting element 12.

The disclosure herein aims to remedy all or some of the drawbacks of the prior art.

SUMMARY

To this end, a subject of the disclosure herein is a tool for laying a sealing strip around a protruding part of a connecting element protruding from a bearing surface, the protruding part having a contour and a height.

According to the disclosure herein, the laying tool comprises an annular duct having an outer surface oriented towards an outer region and an inner surface oriented towards an inner region, the outer surface of the annular duct being configured to delimit, with the bearing surface and the protruding part, a cavity when the annular duct is positioned around the protruding part and in contact with the bearing surface, the annular duct comprising a plurality of outlet orifices configured to connect the inner region of the annular duct and the cavity, and at least one inlet orifice configured to supply the inner region of the annular duct with a pasty composition.

The laying tool makes it possible to achieve better repeatability of the sealing method and to form a regular sealing strip all around the protruding part. In addition, it makes it possible to significantly reduce the quantity of pasty composition used to seal the protruding parts of the connecting elements, and therefore to reduce the costs and the on-board mass.

According to another feature, the annular duct forms a closed loop following a circumferential axis and has, in a plane perpendicular to the circumferential axis, a cross section that is substantially circular with a radius smaller than the height of the protruding part.

According to another feature, the radius of the circular section is between ⅓ and ¾ of the height of the protruding part.

According to another feature, the outer surface comprises a first generatrix included in a surface substantially in the shape of the bearing surface, and a second generatrix identical to the contour of the protruding part, the first and second generatrices dividing the outer surface into first and second complementary regions, the second region being larger than the first region, the outlet orifices being situated in the first region, each inlet orifice being positioned in the second region.

According to another feature, each outlet orifice is situated approximately equidistantly from the first and second generatrices.

According to another feature, the laying tool comprises a plurality of inlet orifices that are distributed regularly around the circumference of the annular duct and are continued by supply ducts, each supply duct having a first end connected to the annular duct and a second end, the various supply ducts having a common second end that leads to the outside via a single supply orifice.

According to another feature, the annular duct and the supply ducts form a single part, the supply ducts being rigid.

According to another feature, the annular duct comprises at least one groove, in the outer surface, configured to allow gas to exit the cavity.

A further subject of the disclosure herein is a method for laying a sealing strip around a protruding part of a connecting element protruding from a bearing surface, the method using a laying tool according to one of the preceding features. According to the disclosure herein, the method comprises a step of fitting the laying tool around the protruding part and in contact with the bearing surface in order that the outer surface of the annular duct of the laying tool, the bearing surface and the protruding part delimit a cavity, a step of injecting a pasty composition into the annular duct such that the pasty composition exits via the outlet orifices in order to fill the cavity, and a step of removing the laying tool.

According to another feature, the method comprises a step of fitting a reinforcing framework around the protruding part before the step of fitting the laying tool around the protruding part.

A further subject of the disclosure herein is an aircraft having a wall of a tank which comprises a bearing surface, at least one protruding part of a connecting element protruding from the bearing surface, and a sealing strip around the protruding part, produced using a laying method according to one of the preceding features.

BRIEF DESCRIPTION OF THE DRAWINGS

Other features and advantages will become apparent from the following description of the disclosure herein, which description is given solely by way of example, with reference to the appended drawings in which.

DETAILED DESCRIPTION

Figure 4:
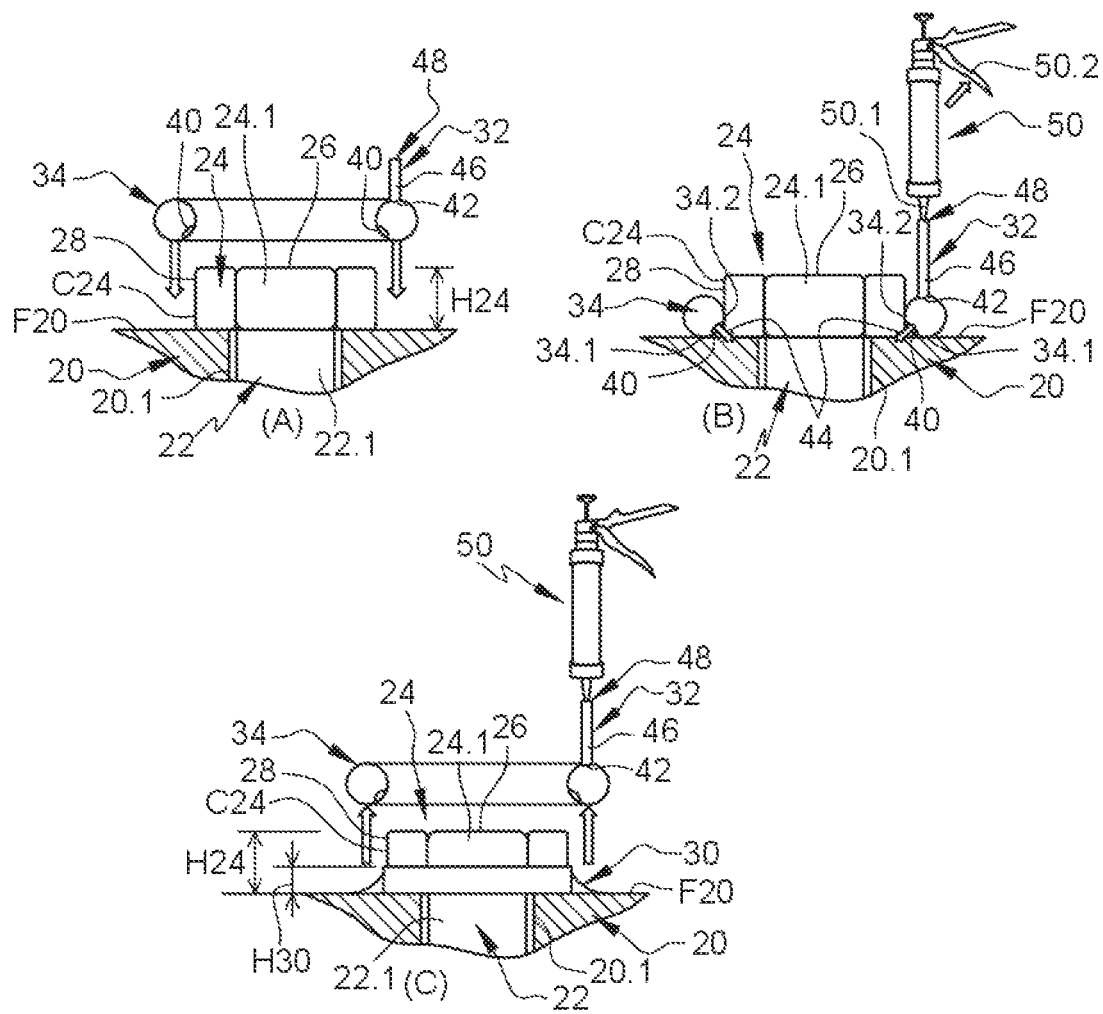
FIG. 4 is a schematic depiction of the various steps of a method for laying a sealing strip around a protruding part of a connecting element, illustrating one embodiment of the disclosure herein.
Figure 10:
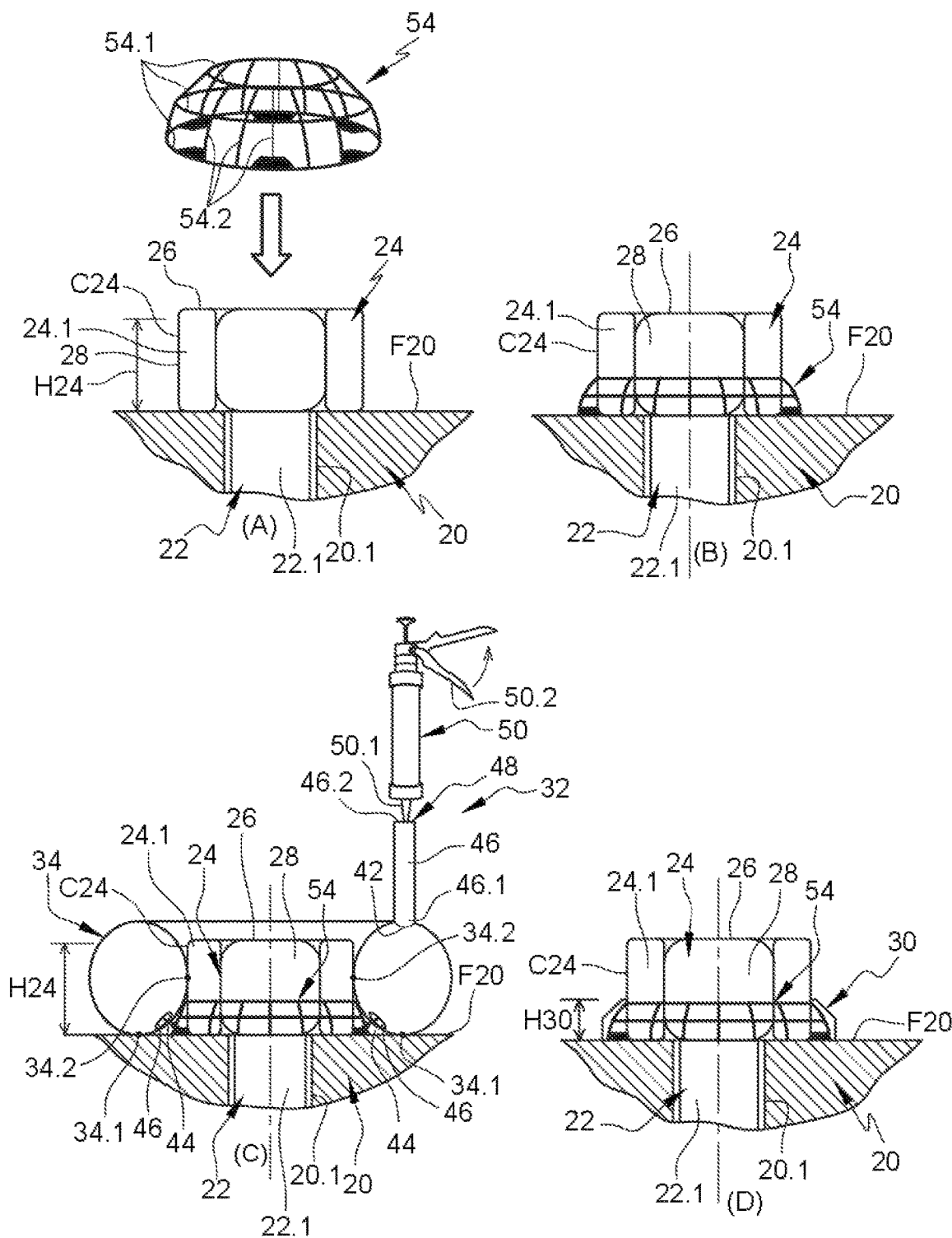
FIG. 10 is a schematic depiction of the various steps of a method for laying a sealing strip around a protruding part of a connecting element, illustrating another embodiment of the disclosure herein.

According to one embodiment, visible in FIGS. 4 and 10, a wall 20 comprises at least one bearing surface F20, at least one hole 20.1 that leads out at the bearing surface F20, and at least one connecting element 22 having a partial shank 22.1 accommodated in the hole 20.1 and at least one protruding part 24 protruding from the bearing surface F20. By way of example, the connecting element 22 is a bolt and the protruding part 24 comprises a screw head 24.1 and optionally a washer interposed between the head 24.1 and the bearing surface F20.

According to one application, the wall 20 delimits a fuel tank of an aircraft. It comprises a plurality of connecting elements 22 passing through it.

The protruding part 24 of a connecting element 22 comprises a frontal surface 26, spaced apart from the bearing surface F20 and positioned in a plane substantially parallel to the bearing surface F20, and at least one lateral surface 28 extending between the bearing surface F20 and the frontal surface 26.

The lateral surface 28 of the protruding part 24 has a contour C24 in a plane parallel to the bearing surface F20, and a height H24 equal to the distance between the bearing surface F20 and the frontal surface 26. According to one embodiment, the protruding part 24 has an identical contour C24 over its entire height. According to one configuration, the contour C24 has a hexagonal shape and the lateral surface 28 comprises six facets. Of course, the disclosure herein is not limited to this configuration. Other geometries are conceivable for the contour C24.

The wall 20 comprises, for each protruding part 24, at least one continuous sealing strip 30, surrounding the protruding part 24, in contact with the bearing surface F20 and with the lateral surface 28 all around the protruding part 24. The sealing strip 30 has a height H30 less than the height H24 of the protruding part. Thus, the frontal surface 26 is clear and is not covered by the sealing strip 30. Since the protruding part 24 is a screw head and not a nut screwed around a threaded shank, only the region between the protruding part 24 and the bearing surface F20 requires a seal.

According to one embodiment, the sealing strip 30 is obtained from a pasty composition, such as sealant mastic for example, which is able to cure.

This sealing strip 30 is laid using a laying tool 32 illustrated in FIGS. 3 to 10.

This laying tool 32 comprises an annular duct 34 having an outer surface F34 and an inner surface F34', the outer surface F34 having a first generatrix 34.1 included in a surface substantially in the shape of the bearing surface F20 and a second generatrix 34.2 identical to the contour C24 of the protruding part 24, the first and second generatrices 34.1, 34.2 dividing the outer surface F34 into a first region 36 which extends from the first generatrix 34.1 to the second generatrix 34.2 and a second region 38 which extends from the second generatrix 34.2 to the first generatrix 34.1, the first and second regions 34.1, 34.2 being complementary, the second region 38 being larger than the first region 36.

The annular duct 34 has outlet orifices 40 that connect the outer and inner surfaces F34, F34' and are situated in the first region 36, and at least one inlet orifice 42 that connects the outer and inner surfaces F34, F34' and is situated in the second region 38.

In operation, the annular duct 34 is positioned around the protruding part 24 and pressed against the bearing surface F20. The first generatrix 34.1 is then in contact with the bearing surface F20 and the second generatrix 34.2 is in contact with the lateral surface 28 of the protruding part 24 or very slightly spaced apart from the latter.

The expression "very slightly spaced apart" means that the space between the annular duct 34 and the protruding part 24 is not large enough to allow the pasty composition of the sealing strip 30 to pass through it.

When the annular duct 34 is positioned around the protruding part 24, in contact with the bearing surface F20, it delimits with the protruding part 24 and the bearing surface F20 a cavity 44 into which the pasty composition of the sealing strip 30 is injected before it cures. This cavity 44 is centred with respect to the protruding part 24 and has a substantially constant cross section all around the protruding part 24, which makes it possible to obtain a sealing strip 30 with a substantially constant cross section around the protruding part.

According to one embodiment, the annular duct 34 forms a closed loop following a circumferential axis A34 (visible in particular in FIG. 7) and has, in a transverse plane (perpendicular to the circumferential axis A34), a substantially circular cross section. This circular section has a radius smaller than the height H24. According to one configuration, the radius of the circular section is between ⅓ and ¾ of the height H24 of the protruding part 24.

Figure 1:
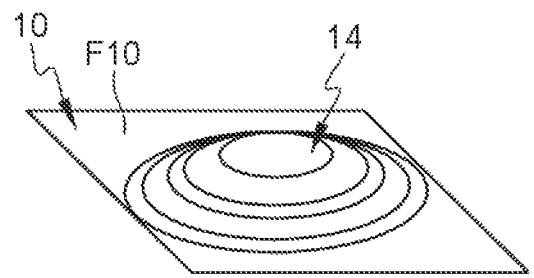
FIG. 1 is a perspective view of a mass of sealant mastic covering a head of a connecting element, illustrating one embodiment of the prior art.
Figure 2:
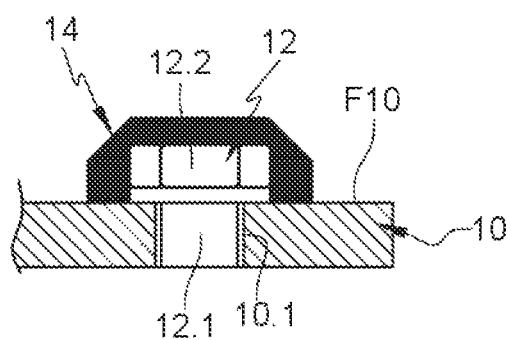
FIG. 2 is a cross section through a head of a connecting element covered with a mass of sealant mastic, illustrating one embodiment of the prior art.
Figure 3:
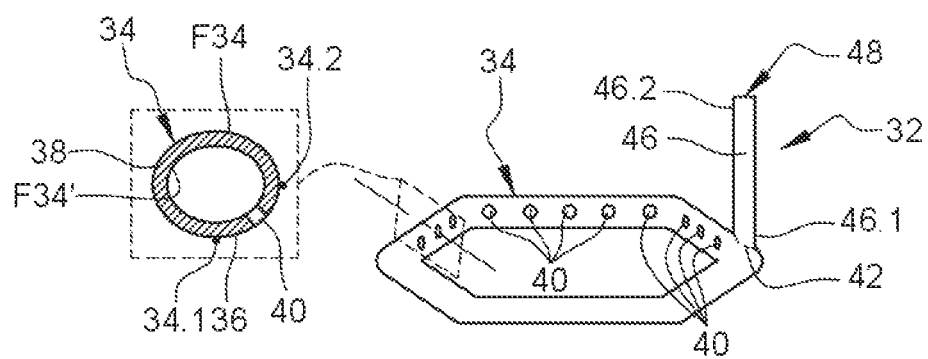
FIG. 3 is a perspective view of a tool for laying a sealing strip, illustrating one embodiment of the disclosure herein.

As illustrated in FIG. 3, in the case of a circular cross section, each outlet orifice 40 is situated approximately equidistantly from the first generatrix 34.1 and from the second generatrix 34.2.

Of course, the disclosure herein is not limited to this shape for the cross section. In a variant, the cross section could be elliptical or be any other shape.

In the case of a protruding part 24 with a hexagonal section, the circumferential axis A34 describes a hexagonal polygon and the annular duct 34 comprises six rectilinear portions.

The outlet orifices 40 are distributed around the entire circumference of the annular duct 34. According to one arrangement, each portion of the annular duct 34 comprises from three to six outlet orifices 40. According to one configuration, the outlet orifices 40 all have substantially the same passage cross section, which is approximately circular.

Of course, the disclosure herein is not limited to this geometry for the annular duct, to this distribution for the outlet orifices 40 or to this passage cross section.

Regardless of the embodiment, the annular duct 34 comprises an outer surface F34 oriented towards an outer region and an inner surface F34' oriented towards an inner region, the outer surface F34 of the annular duct 34 being configured to delimit, with the bearing surface F20 and the protruding part 24, a cavity 44 when the annular duct 34 is positioned around the protruding part 24 and in contact with the bearing surface F20. In addition, the annular duct 34 comprises a plurality of outlet orifices 40 that connect the inner region of the annular duct 34 and the cavity 44, and at least one inlet orifice 42 configured to supply the inner region with a pasty composition.

According to one embodiment, the laying tool 32 comprises, for each inlet orifice 42, a supply duct 46 which continues the inlet orifice 42 and has a first end 46.1 connected to the annular duct 34 and a second end 46.2 forming a supply orifice 48.

According to the variants that are visible in FIGS. 3 to 8 and 10, the annular duct 34 and the supply duct(s) 46 form only a single part.

Figure 9:
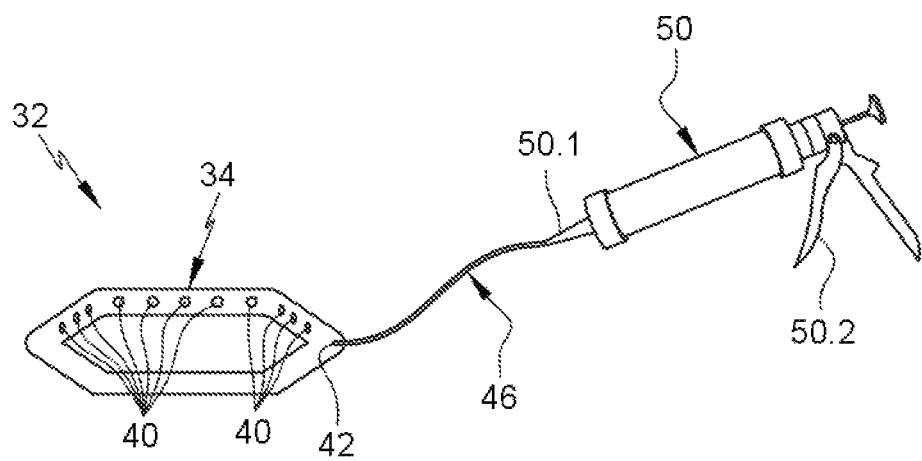
FIG. 9 is a perspective view of a tool for laying a sealing strip, illustrating another embodiment of the disclosure herein.

According to another variant that is visible in FIG. 9, the supply duct 46 and the annular duct 34 are two separate elements.

As illustrated in FIGS. 3, 4, 8 and 10, the annular duct 34 comprises one inlet orifice 42 continued by a single supply duct 46.

Figure 5:
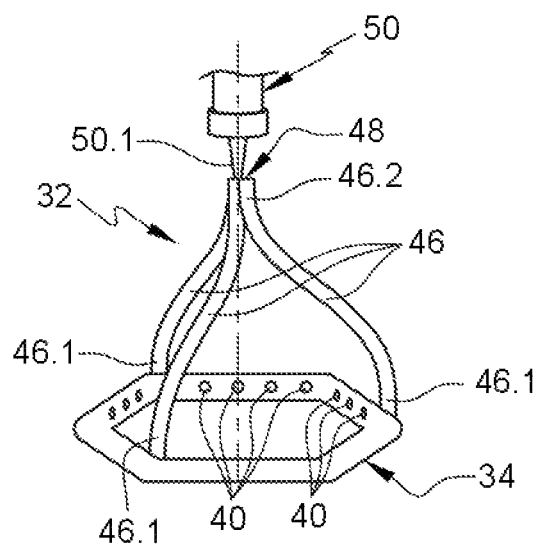
FIG. 5 is a perspective view of a tool for laying a sealing strip, illustrating another embodiment of the disclosure herein.
Figure 6:
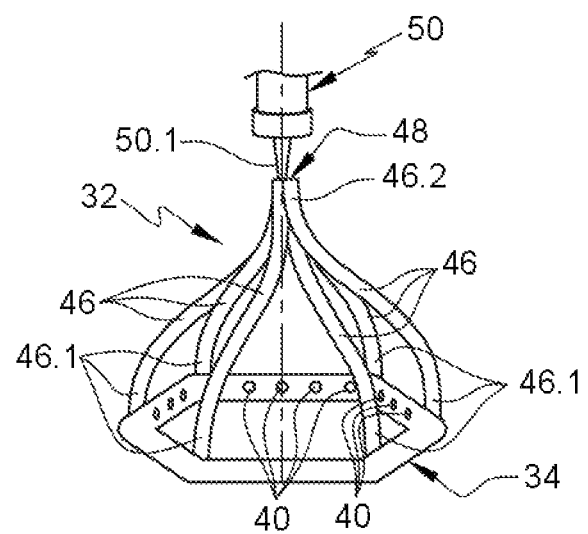
FIG. 6 is a perspective view of a tool for laying a sealing strip, illustrating another embodiment of the disclosure herein.

According to the embodiments that are visible in FIGS. 5 and 6, the laying tool 32 comprises a plurality of inlet orifices 42 that are regularly distributed around the circumference of the annular duct 34 and are continued by supply ducts 46. According to one configuration, the various supply ducts 46 have a common second end 46.2 that leads to the outside via a single supply orifice 48.

According to the variants, the supply ducts 46 may be flexible, as illustrated in FIGS. 5 and 9, or rigid, as illustrated in FIGS. 3 to 4, 6 and 10.

The fact that a plurality of inlet orifices 42 are provided allows a better distribution of the pasty composition in the annular duct 34 and all around the protruding part 24. When the supply ducts 46 are rigid, this confers greater stability on the laying tool 32.

The annular duct 34 and the supply duct(s) 46 may be metallic and/or made of plastics material.

According to one embodiment, the laying tool 32 comprises at least one mastic gun 50 for injecting the pasty composition into the annular duct 34. This mastic gun 50 comprises an outlet nozzle 50.1 directly connected to an inlet orifice 42 or to a supply orifice 48 of a supply duct 46.

Figure 7:
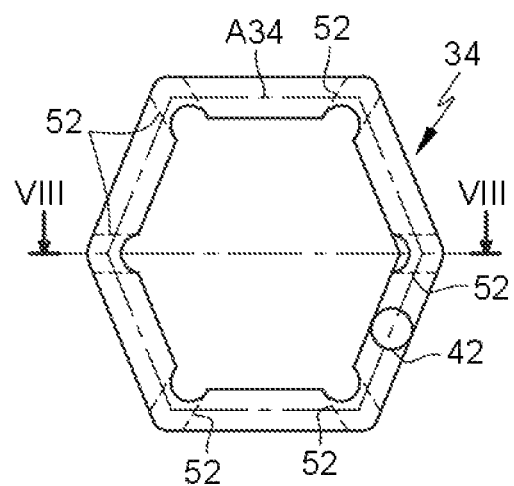
FIG. 7 is a top view of a tool for laying a sealing strip, illustrating another embodiment of the disclosure herein.
Figure 8:
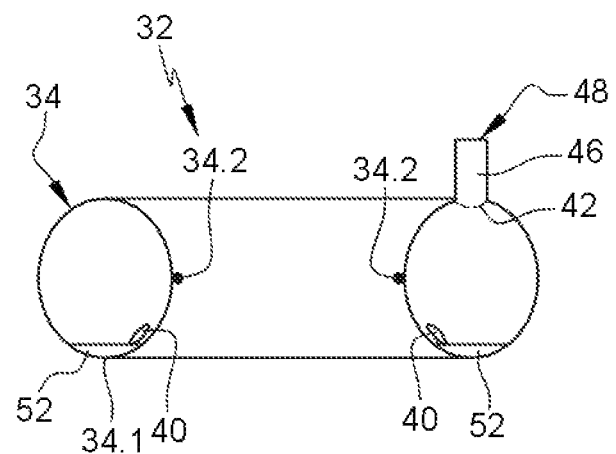
FIG. 8 is a cross section on the line VIII-VIII in FIG. 7.

According to one embodiment, visible in FIGS. 7 and 8, the annular duct 34 comprises at least one groove 52, in the outer surface F34, allowing the gas to exit the cavity 44.

Thus, each groove 52 connects the first and second regions 36, 38, intersecting the first generatrix 34.1. Thus, when the annular duct 34 is in contact with a bearing surface F20 and positioned around a protruding part 24, the gases can flow out of the cavity via each groove 52, which then forms a vent. According to one arrangement, the annular duct 34 comprises a plurality of grooves 52 distributed regularly around its circumference. According to one configuration, in the case of an annular duct 34 having six rectilinear portions, it comprises six grooves 52 positioned in the regions where the rectilinear portions meet.

Each groove 52 has a passage cross section dimensioned to allow the gases, in particular air, to pass through, while restricting the passage of the pasty composition forming the sealing strip 30.

According to one embodiment, visible in FIG. 10, the sealing strip 30 comprises at least one reinforcing framework 54 embedded in the pasty composition. According to one configuration, this reinforcing framework 54 is in the form of a grid having circumferential reinforcing members 54.1 and radial reinforcing members 54.2 connecting the circumferential reinforcing members 54.1. This reinforcing framework 54 is dimensioned to be accommodated in the cavity 44 delimited by the outer surface F34 of the annular duct 34, the bearing surface F20 and the lateral surface 28 of the protruding part 24.

This reinforcing framework 54, which is metallic or made of plastics material, reinforces the mechanical strength of the sealing strip 30.

The method for laying the sealing strip 30 is described with regard to FIG. 4.

This method comprises a first step of fitting the laying tool 32 around the protruding part 24, as illustrated in part (A) of FIG. 4, until it is in contact with the bearing surface F20. As illustrated in part (B) of FIG. 4, the outer surface F34 of the annular duct 34, the bearing surface F20 and the lateral surface 28 of the protruding part 24 delimit a cavity 44. Next, the method comprises a step of injecting a pasty composition into the cavity 44. To this end, the outlet nozzle 50.1 of a mastic gun 50 is connected to the supply orifice 48 of a supply duct 46. By pressing the trigger 50.2 of the mastic gun 50, the pasty composition is injected into the annular duct 34 and exits, via all the outlet orifices 40, in order to uniformly fill the cavity 44. When the pasty composition takes up the entire cavity 44, the method comprises a step of removing the laying tool 32 and more particularly the annular duct 34, as illustrated in part (C) of FIG. 4. The sealing strip 30 then extends around the entire circumference of the protruding part 34 and connects the bearing surface F20 and the lateral surface 28 of the protruding part 24 in a sealing manner.

According to another mode of operation, visible in FIG. 10, the method for laying the sealing strip 30 comprises a step of fitting a reinforcing framework 54 around the protruding part 24 before the step of fitting the laying tool 32 around the protruding part 24, as illustrated in parts (A) and (B) of FIG. 10. Next, the pasty composition is injected into the cavity 44, as illustrated in part (C) of FIG. 10. Lastly, the laying tool 32 (more particularly the annular duct 34) is removed, as illustrated in part (D) of FIG. 10. The sealing strip 30, in which the reinforcing framework 54 is embedded, extends around the entire circumference of the protruding part 34 and connects the bearing surface F20 and the lateral surface 28 of the protruding part 24 in a sealing manner.

The disclosure herein makes it possible to significantly reduce the quantity of pasty composition used to seal the protruding parts 24 of the connecting elements 22, and therefore to reduce the costs and the on-board mass. Lastly, the laying tool 32 allows better repeatability of the method for laying the sealing strip and makes it possible to improve the quality of the seal.

While at least one example embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A tool for laying a sealing strip around a protruding part of a connecting element protruding from a bearing surface, the tool comprising:
   an annular duct having an outer surface, which is oriented towards an outer region of the annular duct, and an inner surface, which is oriented towards an inner region of the annular duct;
   wherein the outer surface of the annular duct is configured to delimit, with the bearing surface and the protruding part, a cavity when the annular duct is positioned around the protruding part and in contact with the bearing surface;
   wherein the annular duct comprises:
      a plurality of outlet orifices configured to connect the inner region of the annular duct and the cavity; and
      at least one inlet orifice configured to supply the inner region of the annular duct with a pasty composition;
   wherein the outer surface comprises:
      a first generatrix included in a surface substantially in a shape of the bearing surface; and
      a second generatrix identical to the contour of the protruding part;
   wherein the first and second generatrices divide the outer surface into first and second complementary regions, the second complementary region being larger than the first complementary region;
   wherein the plurality of outlet orifices are situated in the first complementary region; and
   wherein the at least one inlet orifice is positioned in the second complementary region.

2. The tool according to claim 1, wherein the annular duct forms a closed loop following a circumferential axis and has, in a plane perpendicular to the circumferential axis, a cross section that is substantially circular with a radius smaller than a height of the protruding part.

3. The tool according to claim 2, wherein the radius of the circular cross section is between ⅓ and ¾ of the height of the protruding part.

4. The tool according to claim 1, wherein each of the plurality of outlet orifices is situated approximately equidistantly from the first and second generatrices.

5. The tool according to claim 1, wherein:
   the at least one inlet orifice of the annular duct comprises a plurality of inlet orifices that are distributed regularly around a circumference of the annular duct and are continued by supply ducts;
   each of the supply duct has a first end, which is connected to the annular duct, and a second end; and
   the second end of each of the supply ducts are connected together as a common second end leading out via a single supply orifice.

6. The tool according to claim 5, wherein:
   the annular duct and the supply ducts form a single part; and
   the supply ducts are rigid.

7. The tool according to claim 1, wherein the annular duct comprises, in the outer surface, at least one groove configured to allow gas to exit the cavity.

8. A method for laying a sealing strip around a protruding part of a connecting element protruding from a bearing surface, the method comprising:
   providing the tool according to claim 1;
   fitting the tool around the protruding part and in contact with the bearing surface, such that the outer surface of the annular duct of the tool, the bearing surface, and the protruding part delimit a cavity;
   injecting a pasty composition into the annular duct such that the pasty composition exits, via the outlet orifices, to fill the cavity; and
   removing the tool.

9. The method according to claim 8, comprising fitting a reinforcing framework around the protruding part before the fitting of the tool around the protruding part.

10. An aircraft comprising:
    a wall of a tank, which comprises:
       a bearing surface, wherein at least one protruding part of a connecting element protrudes from the bearing surface; and
       a sealing strip around the protruding part;
    wherein the wall of the tank is produced using the method according to claim 9.

11. A tool for laying a sealing strip around a protruding part of a connecting element protruding from a bearing surface, the tool comprising:
    an annular duct having an outer surface, which is oriented towards an outer region of the annular duct, and an inner surface, which is oriented towards an inner region of the annular duct;
    wherein the outer surface of the annular duct is configured to delimit, with the bearing surface and the protruding part, a cavity when the annular duct is positioned around the protruding part and in contact with the bearing surface;
    wherein the annular duct comprises:
       a plurality of outlet orifices configured to connect the inner region of the annular duct and the cavity; and
       a plurality of inlet orifices that are distributed regularly around a circumference of the annular duct, are continued by supply ducts, and are configured to supply the inner region of the annular duct with a pasty composition;
    wherein each of the supply ducts has a first end, which is connected to the annular duct, and a second end; and
    wherein the second end of each of the supply ducts are connected together as a common second end leading out via a single supply orifice.

12. The tool according to claim 11, wherein the annular duct forms a closed loop following a circumferential axis and has, in a plane perpendicular to the circumferential axis, a cross section that is substantially circular with a radius smaller than a height of the protruding part.

13. The tool according to claim 12, wherein the radius of the circular section is between ⅓ and ¾ of the height of the protruding part.

14. The tool according to claim 11, wherein:
- the annular duct and the supply ducts form a single part; and
- the supply ducts are rigid.

15. The tool according to claim 11, wherein the annular duct comprises, in the outer surface, at least one groove configured to allow gas to exit the cavity.

16. A method for laying a sealing strip around a protruding part of a connecting element protruding from a bearing surface, the method comprising:
- providing the tool according to claim 12;
- fitting the tool around the protruding part and in contact with the bearing surface, such that the outer surface of the annular duct of the tool, the bearing surface, and the protruding part delimit a cavity;
- injecting a pasty composition into the annular duct such that the pasty composition exits, via the outlet orifices, to fill the cavity; and
- removing the tool.

17. The method according to claim 16, comprising fitting a reinforcing framework around the protruding part before the fitting of the tool around the protruding part.

* * * * *